(12) United States Patent
Martin-Martin et al.

(10) Patent No.: US 12,367,662 B2
(45) Date of Patent: Jul. 22, 2025

(54) SYSTEMS AND METHODS FOR VIDEO MODELS WITH PROCEDURE UNDERSTANDING

(71) Applicant: Salesforce, Inc., San Francisco, CA (US)

(72) Inventors: Roberto Martin-Martin, Austin, TX (US); Silvio Savarese, San Francisco, CA (US); Honglu Zhou, San Francisco, CA (US); Juan Carlos Niebles Duque, Mountain View, CA (US)

(73) Assignee: Salesforce, Inc., San Francisco, CA (US)

( * ) Notice: Subject to any disclaimer, the term of this patent is extended or adjusted under 35 U.S.C. 154(b) by 412 days.

(21) Appl. No.: 18/159,189

(22) Filed: Jan. 25, 2023

(65) Prior Publication Data
US 2024/0161464 A1    May 16, 2024

Related U.S. Application Data

(60) Provisional application No. 63/383,399, filed on Nov. 11, 2022.

(51) Int. Cl.
*G06K 9/62* (2022.01)
*G06F 40/30* (2020.01)
(Continued)

(52) U.S. Cl.
CPC ............ *G06V 10/774* (2022.01); *G06F 40/30* (2020.01); *G06F 40/40* (2020.01);
(Continued)

(58) Field of Classification Search
None
See application file for complete search history.

(56) References Cited

U.S. PATENT DOCUMENTS

| 11,580,302 B2 * | 2/2023 | Taylor | G06F 40/30 |
| 11,625,620 B2 * | 4/2023 | Singaraju | G06N 20/00 |
| | | | 706/14 |

(Continued)

FOREIGN PATENT DOCUMENTS

| CN | 107015963 A | * | 8/2017 | ........... G06F 16/367 |
| CN | 110070023 B | * | 6/2020 | ......... G06K 9/00718 |
| CN | 108615047 B | * | 7/2022 | ........... G06K 9/6267 |

OTHER PUBLICATIONS

CN-107015963-A (machine translation) (Year: 2017).*

(Continued)

*Primary Examiner* — Feng Niu
(74) *Attorney, Agent, or Firm* — Haynes and Boone, LLP

(57) ABSTRACT

Embodiments described herein provide systems and methods for training video models to perform a task from an input instructional video. A procedure knowledge graph (PKG) may be generated with nodes representing procedure steps, and edges representing relationships between the steps. The PKG may be generated based on text and/or video training data which includes procedures (e.g., instructional videos). Using the PKG, a video model may be trained using the PKG to provide supervisory training signals for a number of tasks. Once the model is trained, it may be fine-tuned for a specific task which benefits from the model being trained in a way that makes the model embed procedural information when encoding videos.

20 Claims, 12 Drawing Sheets

100

(51) Int. Cl.
*G06F 40/40* (2020.01)
*G06V 10/774* (2022.01)
*G06V 10/776* (2022.01)
*G06V 10/82* (2022.01)
*G06V 20/40* (2022.01)
*G06V 20/70* (2022.01)

(52) U.S. Cl.
CPC ........ *G06V 10/7753* (2022.01); *G06V 10/776* (2022.01); *G06V 10/82* (2022.01); *G06V 20/41* (2022.01); *G06V 20/70* (2022.01)

(56) References Cited

U.S. PATENT DOCUMENTS

| | | | | |
|---|---|---|---|---|
| 11,687,795 | B2* | 6/2023 | Ferreira Moreno | G06F 16/90335 706/12 |
| 11,755,924 | B2* | 9/2023 | Madden | G06N 20/00 706/12 |
| 11,847,164 | B2* | 12/2023 | Wang | G06V 40/172 |
| 12,046,023 | B2* | 7/2024 | Vongkulbhisal | G06N 3/04 |
| 2015/0066477 | A1* | 3/2015 | Hu | G06F 40/211 704/9 |
| 2020/0057946 | A1* | 2/2020 | Singaraju | G06N 5/025 |
| 2020/0265324 | A1* | 8/2020 | Ferreira Moreno | G06N 5/022 |
| 2021/0034985 | A1* | 2/2021 | Vongkulbhisal | G06F 16/908 |
| 2021/0216717 | A1* | 7/2021 | Wang | G06F 16/3344 |
| 2022/0036001 | A1* | 2/2022 | Taylor | G06F 40/279 |
| 2022/0100800 | A1* | 3/2022 | Georgopoulos | G06F 16/3344 |
| 2022/0261599 | A1* | 8/2022 | Kastaniotis | G06N 3/04 |
| 2023/0169361 | A1* | 6/2023 | Mitra | G06N 3/006 706/12 |
| 2023/0206069 | A1* | 6/2023 | Zhang | G06N 3/045 706/15 |
| 2023/0401424 | A1* | 12/2023 | Jiang | G06N 3/043 |
| 2024/0135110 | A1* | 4/2024 | Mujica-Parodi, III | G06F 40/20 |
| 2024/0289647 | A1* | 8/2024 | Zhao | G06N 5/022 |

OTHER PUBLICATIONS

CN-108615047-B (machine translation) (Year: 2022).*
CN-110070023-B (machine translation) (Year: 2020).*
Gao et al., "A Survey of Graph Neural Networks for Recommender Systems: Challenges, Methods, and Directions." arXiv preprint arXiv:2109.12843 (2022). (Year: 2022).*
Yu et al., "Knowledge Embedding Based Graph Convolutional Network." arXiv preprint arXiv:2006.07331 (2021). (Year: 2021).*
Mehta et al., "Open-Domain Trending Hashtag Recommendation for Videos," 2021 IEEE International Symposium on Multimedia (ISM), Naple, Italy, 2021, pp. 174-181, doi: 10.1109/ISM52913.2021.00035. (Year: 2021).*
Xudong Lin, Fabio Petroni, Gedas Bertasius, Marcus Rohrbach, Shih-Fu Chang, and Lorenzo Torresani. Learning to recognize procedural activities with distant supervision. In Proceedings of the IEEE/CVF Conference on Computer Vision and Pattern Recognition, pp. 13853-13863, 2022.
Muheng Li, Lei Chen, Yueqi Duan, Zhilan Hu, Jianjiang Feng, Jie Zhou, and Jiwen Lu. Bridge-prompt: Towards ordinal action understanding in instructional videos. In Proceedings of the IEEE/CVF Conference on Computer Vision and Pattern Recognition, pp. 19880-19889, 2022.
Reza Ghoddoosian, Saif Sayed, and Vassilis Athitsos. Hierarchical modeling for task recognition and action segmentation in weakly-labeled instructional videos. In Proceedings of the IEEE/CVF Winter Conference on Applications of Computer Vision, pp. 1922-1932, 2022.
Ludan Ruan and Qin Jin. Survey: Transformer based videolanguage pre-training. AI Open, 2022.
Madeline C Schiappa, Yogesh S Rawat, and Mubarak Shah. Self-supervised learning for videos: A survey. arXiv preprint arXiv:2207.00419, 2022.
Hassan Akbari, Liangzhe Yuan, Rui Qian, Wei-Hong Chuang, Shih-Fu Chang, Yin Cui, and Boqing Gong. Vatt: Transformers for multimodal self-supervised learning from raw video, audio and text. Advances in Neural Information Processing Systems, 34:24206-24221, 2021.
Antoine Miech, Jean-Baptiste Alayrac, Lucas Smaira, Ivan Laptev, Josef Sivic, and Andrew Zisserman. End-to-end learning of visual representations from uncurated instructional videos. In Proceedings of the IEEE/CVF Conference on Computer Vision and Pattern Recognition, pp. 9879-9889, 2020.

* cited by examiner

| Pretraining Method | | Downstream Transformer | | | | | | |
|---|---|---|---|---|---|---|---|---|
| | | COIN | | | CrossTask | | | |
| | | SF | SR | TR | SF | SR | TR | |
| MIL-NCE* [51] (e(·)) | | 36.55 | 41.98 | 76.62 | 57.96 | 59.90 | 61.71 | |
| DS [46] | | 38.13 | 42.54 | 79.94 | 56.29 | 57.11 | 59.49 | |
| DS* [46] | | 39.54 | 45.97 | 82.66 | 61.23 | 61.91 | 64.24 | |
| PAFoMo (ours) | VNM | 41.98 | 49.80 | 82.88 | 59.45 | 61.00 | 64.77 | |
| | VTM (wikiHow) | 42.05 | 49.89 | 84.45 | 60.27 | 61.26 | 66.25 | |
| | VTM (HT100M) | 41.97 | 48.59 | 83.44 | 60.19 | 60.64 | 65.08 | |
| | VTM (wikiHow + HT100M) | 42.10 | 50.02 | 84.73 | 60.63 | 61.14 | 66.14 | |
| | TCL (wikiHow) | 42.42 | 50.12 | 84.48 | 60.27 | 61.40 | 66.67 | |
| | TCL (HT100M) | 42.05 | 48.68 | 83.20 | 60.49 | 61.86 | 66.03 | |
| | TCL (wikiHow + HT100M) | 42.53 | 49.79 | 83.95 | 60.19 | 61.67 | 66.14 | |
| | NRL (1 hop) | 42.60 | 50.23 | 84.66 | 60.68 | 61.36 | 66.67 | |
| | NRL (2 hops) | 42.53 | 50.13 | 84.31 | 60.68 | 61.60 | 66.67 | |
| | VNM + VTM + TCL + NRL | 42.65 | 50.48 | 85.31 | 61.42 | 62.38 | 67.09 | |
| | Relative Gain to DS | +11.85 | +18.78 | +6.77 | +9.11 | +9.23 | +17.48 | |
| PAFoMo (ours)* | VNM + VTM + TCL + NRL | 43.22 | 50.99 | 85.84 | 62.63 | 63.53 | 68.35 | |
| | Relative Gain to DS* | +9.31 | +10.92 | +3.85 | +2.29 | +2.62 | +6.40 | |

| | Downstream MLP | | | | | |
|---|---|---|---|---|---|---|
| | | COIN | | | CrossTask | |
| SF | SR | TR | SF | SR | TR |
| 3.16 | 1.17 | 21.06 | 27.71 | 24.98 | 5.27 |
| 32.54 | 34.07 | 72.65 | 49.95 | 50.23 | 57.28 |
| 30.88 | 32.74 | 77.66 | 52.97 | 53.69 | 61.08 |
| 37.56 | 42.32 | 82.23 | 57.08 | 58.23 | 64.14 |
| 38.13 | 42.56 | 82.41 | 58.48 | 59.02 | 65.82 |
| 36.87 | 40.07 | 81.52 | 56.45 | 57.42 | 65.61 |
| 38.12 | 42.68 | 82.77 | 58.87 | 59.30 | 66.14 |
| 39.04 | 44.16 | 82.84 | 58.48 | 59.59 | 65.93 |
| 38.86 | 43.56 | 82.55 | 58.38 | 58.63 | 64.66 |
| 38.61 | 43.27 | 82.95 | 58.40 | 59.26 | 65.08 |
| 39.58 | 45.38 | 83.45 | 59.12 | 59.59 | 65.95 |
| 40.55 | 45.82 | 83.84 | 60.13 | 60.23 | 66.98 |
| 39.82 | 44.78 | 83.88 | 59.53 | 60.16 | 67.41 |
| +22.37 | +31.44 | +15.46 | +19.18 | +19.77 | +17.69 |
| 38.38 | 42.95 | 83.41 | 60.38 | 61.21 | 68.35 |
| +24.28 | +31.19 | +7.40 | +13.99 | +14.01 | +11.90 |

From FIG. 6A

FIG. 6B

|  | VNM | VTM(w) | VTM(h) | VTM(w+h) | TCL(w) | TCL(h) | TCL(w+h) | NRL(1hop) | NRL(2hops) |
|---|---|---|---|---|---|---|---|---|---|
| VNM |  | 0.00 | 0.67 | 0.00 | 0.00 | 0.08 | 0.08 | 0.00 | 0.00 |
| VTM(w) | 1.00 |  | 1.00 | 0.25 | 0.17 | 0.58 | 0.50 | 0.00 | 0.08 |
| VTM(h) | 0.33 | 0.00 |  | 0.00 | 0.00 | 0.17 | 0.17 | 0.00 | 0.00 |
| VTM(w+h) | 1.00 | 0.75 | 1.00 |  | 0.33 | 0.75 | 0.58 | 0.17 | 0.08 |
| TCL(w) | 1.00 | 1.00 | 1.00 | 0.67 |  | 0.83 | 0.75 | 0.25 | 0.17 |
| TCL(h) | 0.92 | 0.50 | 0.83 | 0.25 | 0.17 |  | 0.33 | 0.08 | 0.08 |
| TCL(w+h) | 0.92 | 0.50 | 0.92 | 0.50 | 0.25 | 0.67 |  | 0.08 | 0.17 |
| NRL(1hop) | 1.00 | 1.00 | 1.00 | 0.83 | 0.92 | 0.92 | 0.92 |  | 0.42 |
| NRL(2hops) | 1.00 | 0.92 | 1.00 | 0.92 | 0.92 | 0.92 | 0.92 | 0.75 |  |

FIG. 7

SYSTEMS AND METHODS FOR VIDEO MODELS WITH PROCEDURE UNDERSTANDING

CROSS REFERENCE(S)

The instant application is a nonprovisional of and claim priority under 35 U.S.C. 119 to U.S. provisional application No. 63/383,399, filed Nov. 11, 2022 which is hereby expressly incorporated by reference herein in its entirety.

TECHNICAL FIELD

The embodiments relate generally to natural language processing and machine learning systems, and more specifically to systems and methods for video models with procedure understanding.

BACKGROUND

Machine learning systems have been widely used in the analysis of video clips, for example to predict information such as captions. Existing video foundation models are trained with objectives which focus on simple matching tasks which do not capture the temporal relationships between clips within a longer video. For instructional videos that provide illustrative instructions to complete a task (e.g., to change a tire, to cook a dish, etc.), existing models often fail to capture the information in such videos, such as predicting a next step in a procedure. Due to the small amount of available annotations in such videos, acquiring procedural knowledge from unlabeled videos can be challenging. Procedure knowledge refers to structural information about a multi-step task such as the identity of the task (e.g., "make latte"), its steps (e.g., "grind coffee beans," "pour milk," "add sugar," etc.), or the potential next steps given partial progress in its execution. Therefore, there is a need for improved systems and methods for video models.

BRIEF DESCRIPTION OF THE DRAWINGS

FIGS. 6A-6B provide charts illustrating exemplary performance of different embodiments described herein.

FIG. 7 provides a chart illustrating exemplary performance of different embodiments described herein.

Figure 1:
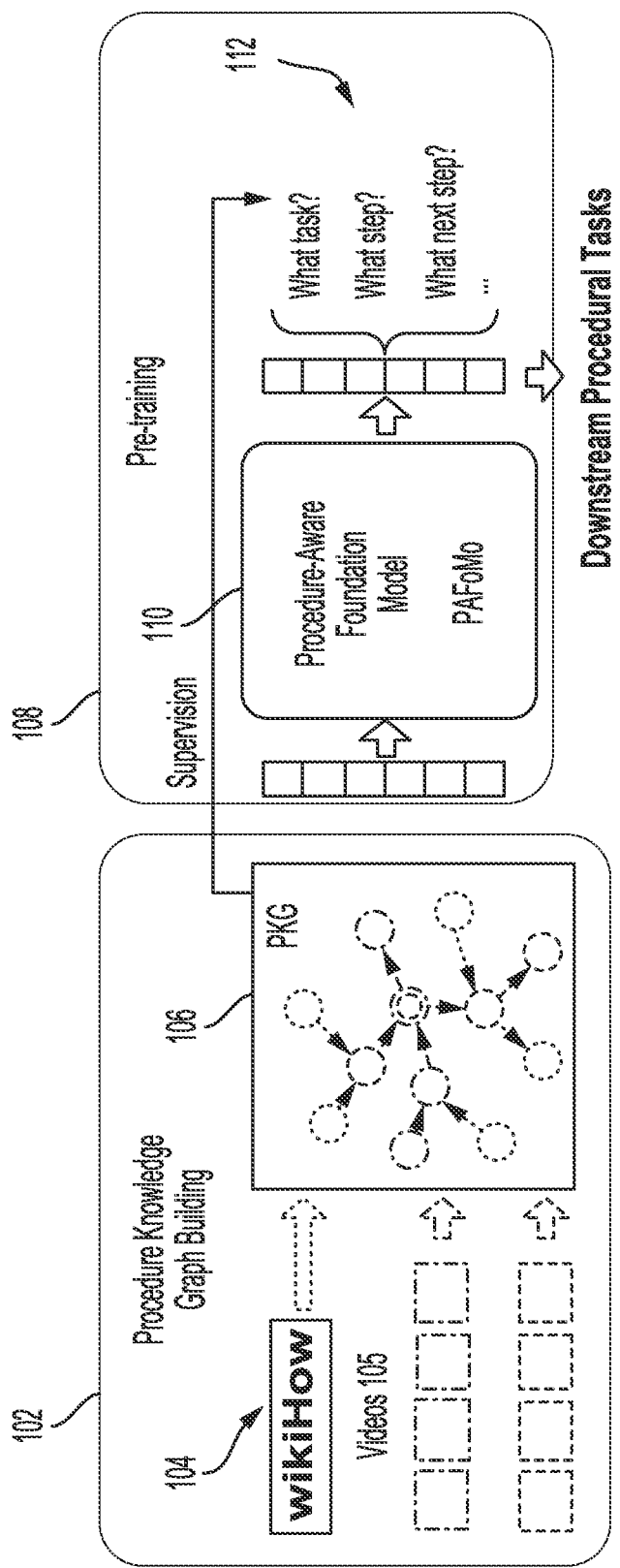
FIG. 1 is a simplified diagram illustrating a framework for training a video model with procedure understanding according to some embodiments.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Overview

Machine learning systems have been widely used in tasks related to video data such as aligning video clips with captions. Existing video foundation models, however, are inadequate for tasks that require procedure understanding when the video contains an explanation of a procedure. This is because existing video models are trained with objectives which focus on simpler matching tasks which do not capture the temporal relationships between clips within a longer video. Specifically, due to the small amount of available annotations, a key challenge in procedure understanding is to be able to acquire procedural knowledge from unlabeled videos. Procedure knowledge refers to structural information about a multi-step task such as the identity of the task (e.g., "make latte"), its steps (e.g., "pour milk"), or the potential next steps given partial progress in its execution.

In view of the need for improved video models with procedure understanding, embodiments described herein provide systems and methods for training a video foundation model (i.e., a model which may be fine-tuned for a number of different tasks) to extract procedural knowledge from an instructional video and thus to output a series of instructional steps according to the procedural knowledge. The steps comprised in the instructional video and their relations may be represented by a procedure knowledge graph (PKG), where nodes are discrete steps and edges connect steps that occur sequentially in the instructional activities. This graph can then be used to generate pseudo labels to train the video foundation model to generate a video representation that encodes the procedure knowledge.

A PKG may be generated by combining information from a text-based procedure knowledge database and/or an instructional video corpus. The instruction videos may be unlabeled, may include captions, or may otherwise be associated with related procedure information. The PKG can then produce pseudo labels to train the video foundation model to generate video representations that encode procedure knowledge. In this way, the pseudo labels can be leveraged with pre-training objectives to elicit the procedure knowledge encoded in the PKG to the procedure-understanding model.

Embodiments described herein provide a number of benefits. For example, higher accuracy may be achieved on video related tasks which require procedure knowledge such as answering questions about steps such as step recognition and step forecasting. Models described herein may produce more accurate descriptions of steps being demonstrated in an instructional video. This accuracy may be achieved using fewer computer processing and/or memory resources than alternative models. The foundation model may be fine-tuned for a specific task using fewer compute resources than if a model were to be trained from the beginning. By encoding an instructional video with procedural understanding, the generated latent representations of video clips may contain such procedure information in a memory efficient way.

FIG. 1 is a simplified diagram illustrating a framework 100 for training a video model according to some embodiments. The framework 100 comprises procedure knowledge graph (PKG) building module 102 which is operatively connected to pre-training module 108. Specifically, PKG building module 102 illustrates how a database of text instructions 104 (e.g., wikiHow, a user-generated database of instructional text and videos) may be used in combination with unlabeled or labeled instructional videos 105 to produce a PKG 106. The PKG 106 may be used by pre-training module 120 to generate pseudo-labels which a procedure-understanding foundation model 110 may be trained to match when given a video as an input. Additional details are discussed with regard to FIGS. 2-13.

Figure 2:
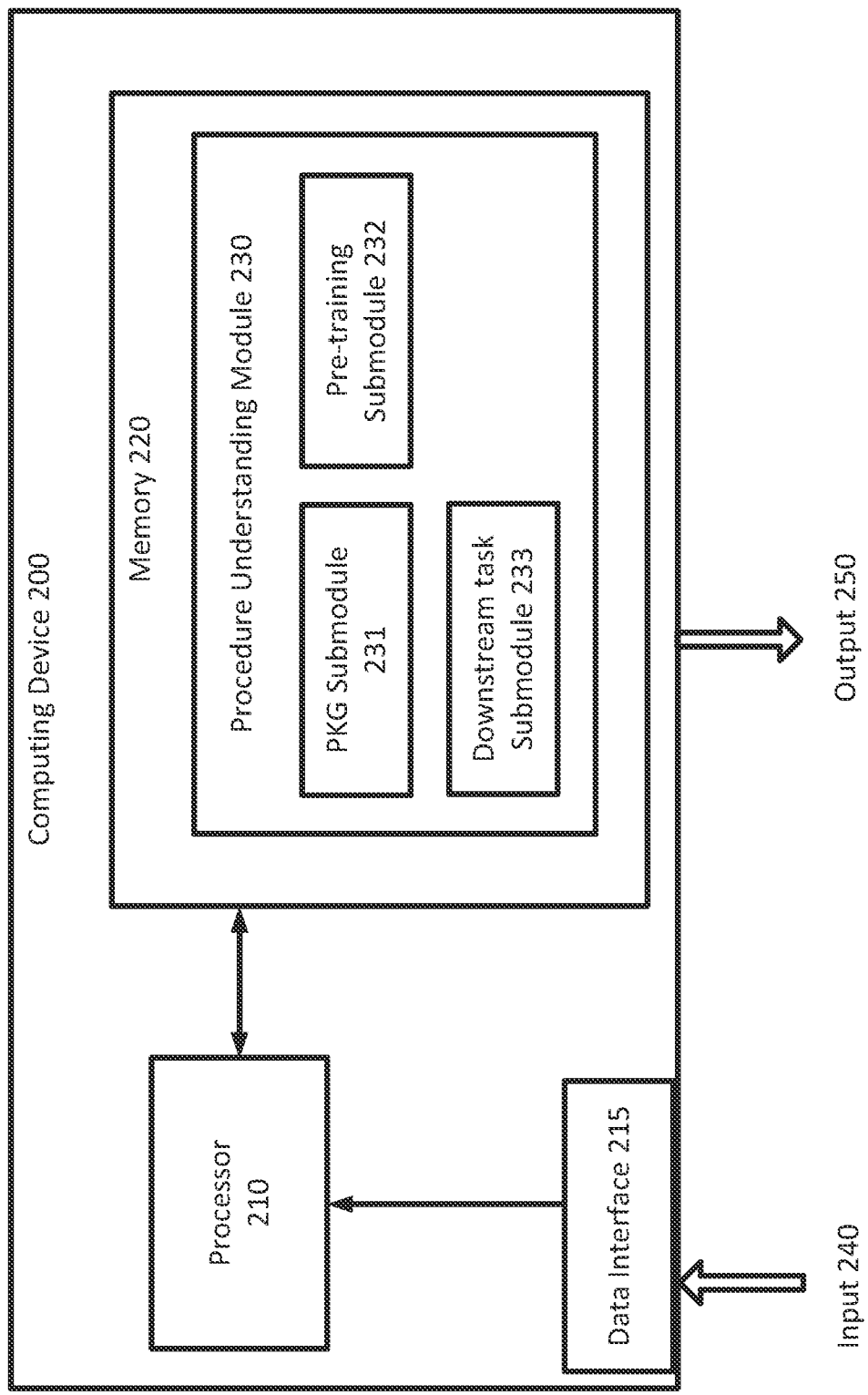
FIG. 2 is a simplified diagram illustrating a computing device implementing the framework described in FIG. 1, according to one embodiment described herein.

FIG. 2 is a simplified diagram illustrating a computing device implementing the framework described in FIG. 1, according to one embodiment described herein. As shown in FIG. 2, computing device 200 includes a processor 210 coupled to memory 220. Operation of computing device 200 is controlled by processor 210. And although computing device 200 is shown with only one processor 210, it is understood that processor 210 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 200. Computing device 200 may be implemented as a stand-alone subsystem, as a board added to a computing device, and/or as a virtual machine.

Memory 220 may be used to store software executed by computing device 200 and/or one or more data structures used during operation of computing device 200. Memory 220 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 210 and/or memory 220 may be arranged in any suitable physical arrangement. In some embodiments, processor 210 and/or memory 220 may be implemented on a same board, in a same package (e.g., system-in-package), on a same chip (e.g., system-on-chip), and/or the like. In some embodiments, processor 210 and/or memory 220 may include distributed, virtualized, and/or containerized computing resources. Consistent with such embodiments, processor 210 and/or memory 220 may be located in one or more data centers and/or cloud computing facilities.

In some examples, memory 220 may include non-transitory, tangible, machine readable media that includes executable code that when run by one or more processors (e.g., processor 210) may cause the one or more processors to perform the methods described in further detail herein. For example, as shown, memory 220 includes instructions for procedure understanding module 230 that may be used to implement and/or emulate the systems and models, and/or to implement any of the methods described further herein. A procedure understanding module 230 may receive input 240 such as an input training data (e.g., instructional videos and text-based procedures) via the data interface 215 and generate an output 250 which may be a video representation, or a result of a task associated with an instructional video.

The data interface 215 may comprise a communication interface, a user interface (such as a voice input interface, a graphical user interface, and/or the like). For example, the computing device 200 may receive the input 240 (such as a training dataset) from a networked database via a communication interface. Or the computing device 200 may receive the input 240, such as instructional videos, from a user via the user interface.

In some embodiments, the procedure understanding module 230 is configured to train a video model as described herein. The procedure understanding module 230 may further include a PKG submodule 231 (e.g., similar to PKG building module 110 in FIG. 1). Submodule 231 may be configured to generate a PKG based on videos and/or text procedures as described herein. The procedure understanding module 230 may further include a Pre-training submodule 232 (e.g., similar to pre-training module 120 in FIG. 1). Submodule 232 may be configured to pre-train a video model using pseudo-labels generated using the PKG from PKG submodule 231 as described herein. The procedure understanding module 230 may further include a downstream task submodule 233. Submodule 231 may be configured to fine-tune the model which was pre-trained by pre-training submodule 232 for a specific task as described herein. In one embodiment, the procedure understanding module 230 and its submodules 231, 232, and 233 may be implemented by hardware, software and/or a combination thereof.

Some examples of computing devices, such as computing device 200 may include non-transitory, tangible, machine readable media that include executable code that when run by one or more processors (e.g., processor 210) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 3:
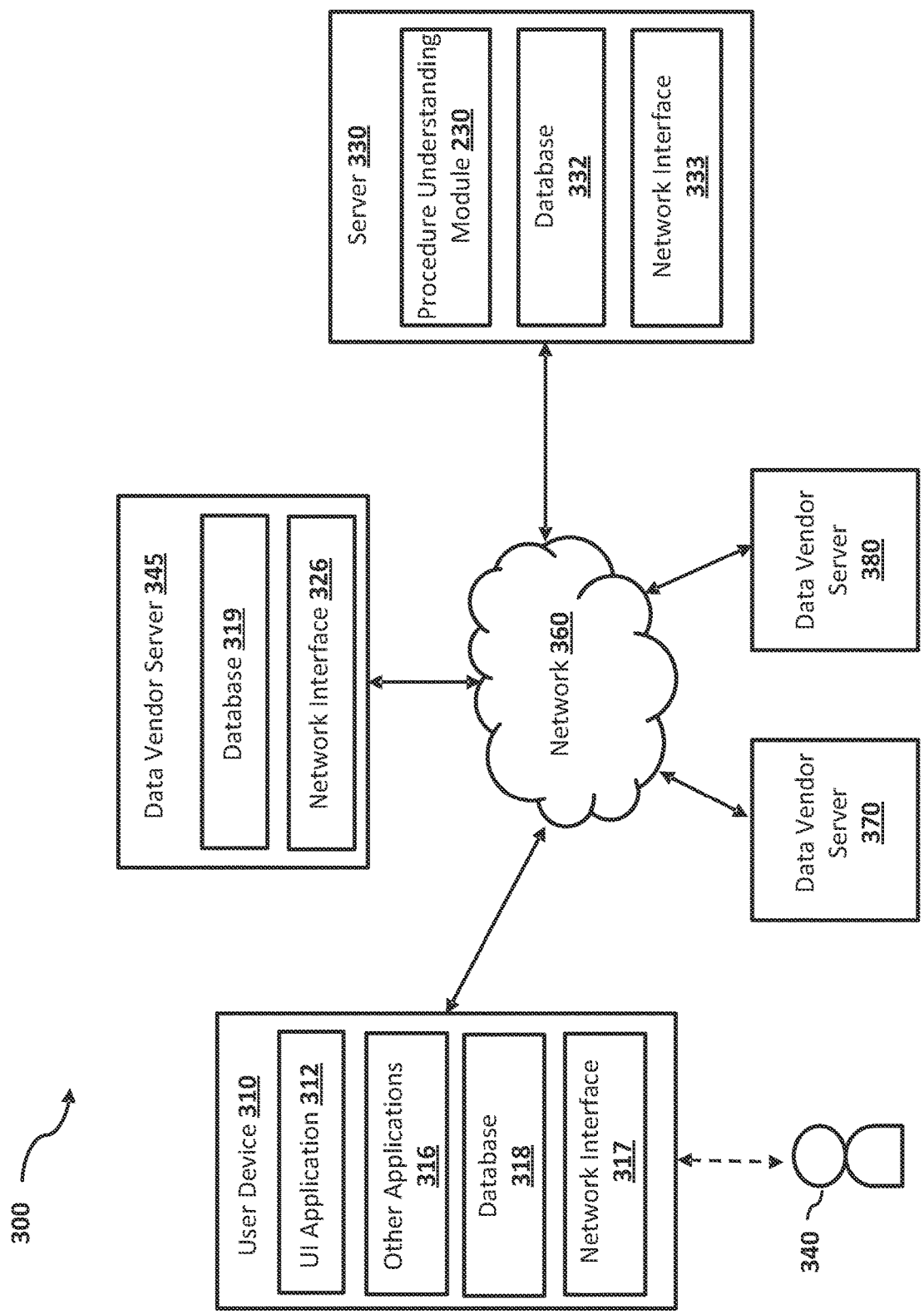
FIG. 3 is a simplified block diagram of a networked system suitable for implementing the framework described in FIGS. 1-2 and other embodiments described herein.

FIG. 3 is a simplified block diagram of a networked system suitable for implementing the framework described in FIGS. 1-2 and other embodiments described herein. In one embodiment, block diagram 300 shows a system including the user device 310 which may be operated by user 340, data vendor servers 345, 370 and 380, server 330, and other forms of devices, servers, and/or software components that operate to perform various methodologies in accordance with the described embodiments. Exemplary devices and servers may include device, stand-alone, and enterprise-class servers which may be similar to the computing device 200 described in FIG. 2, operating an OS such as a MICROSOFT® OS, a UNIX® OS, a LINUX® OS, or other suitable device and/or server-based OS. It can be appreciated that the devices and/or servers illustrated in FIG. 3 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 310, data vendor servers 345, 370 and 380, and the server 330 may communicate with each other over a network 360. User device 310 may be utilized by a user 340 (e.g., a driver, a system admin, etc.) to access the various features available for user device 310, which may include processes and/or applications associated with the server 330 to receive an output data anomaly report.

User device 310, data vendor server 345, and the server 330 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 300, and/or accessible over network 360.

User device 310 may be implemented as a communication device that may utilize appropriate hardware and software configured for wired and/or wireless communication with data vendor server 345 and/or the server 330. For example, in one embodiment, user device 310 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 310 of FIG. 3 contains a user interface (UI) application 312, and/or other applications 316, which may correspond to executable processes, procedures, and/or applications with associated hardware. For example, the user device 310 may receive a message indicating the result of a task associated with an instructional video (e.g., a generated caption) from the server 330 and display the message via the UI application 312. In other embodiments, user device 310 may include additional or different modules having specialized hardware and/or software as required.

In various embodiments, user device 310 includes other applications 316 as may be desired in particular embodiments to provide features to user device 310. For example, other applications 316 may include security applications for implementing client-side security features, programmatic client applications for interfacing with appropriate application programming interfaces (APIs) over network 360, or other types of applications. Other applications 316 may also include communication applications, such as email, texting, voice, social networking, and IM applications that allow a user to send and receive emails, calls, texts, and other notifications through network 360. For example, the other application 316 may be an email or instant messaging application that receives a prediction result message from the server 330. Other applications 316 may include device interfaces and other display modules that may receive input and/or output information. For example, other applications 316 may contain software programs for asset management, executable by a processor, including a graphical user interface (GUI) configured to provide an interface to the user 340 to view video information.

User device 310 may further include database 318 stored in a transitory and/or non-transitory memory of user device 310, which may store various applications and data and be utilized during execution of various modules of user device 310. Database 318 may store user profile relating to the user 340, predictions previously viewed or saved by the user 340, historical data received from the server 330, and/or the like. In some embodiments, database 318 may be local to user device 310. However, in other embodiments, database 318 may be external to user device 310 and accessible by user device 310, including cloud storage systems and/or databases that are accessible over network 360.

User device 310 includes at least one network interface component 317 adapted to communicate with data vendor server 345 and/or the server 330. In various embodiments, network interface component 317 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 345 may correspond to a server that hosts database 319 to provide training datasets including instructional videos and text-based procedure descriptions to the server 330. The database 319 may be implemented by one or more relational database, distributed databases, cloud databases, and/or the like.

The data vendor server 345 includes at least one network interface component 326 adapted to communicate with user device 310 and/or the server 330. In various embodiments, network interface component 326 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 345 may send asset information from the database 319, via the network interface 326, to the server 330.

The server 330 may be housed with the procedure understanding module 230 and its submodules described in FIG. 2. In some implementations, procedure understanding module 230 may receive data from database 319 at the data vendor server 345 via the network 360 to generate a video model or outputs generated by such model. The generated outputs may also be sent to the user device 310 for review by the user 340 via the network 360.

The database 332 may be stored in a transitory and/or non-transitory memory of the server 330. In one implementation, the database 332 may store data obtained from the data vendor server 345. In one implementation, the database 332 may store parameters of the procedure understanding module 230. In one implementation, the database 332 may store previously generated PKGs and/or video models, and the corresponding input feature vectors.

In some embodiments, database 332 may be local to the server 330. However, in other embodiments, database 332 may be external to the server 330 and accessible by the server 330, including cloud storage systems and/or databases that are accessible over network 360.

The server 330 includes at least one network interface component 333 adapted to communicate with user device 310 and/or data vendor servers 345, 370 or 380 over network 360. In various embodiments, network interface component 333 may comprise a DSL (e.g., Digital Subscriber Line)

modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 360 may be implemented as a single network or a combination of multiple networks. For example, in various embodiments, network 360 may include the Internet or one or more intranets, landline networks, wireless networks, and/or other appropriate types of networks. Thus, network 360 may correspond to small scale communication networks, such as a private or local area network, or a larger scale network, such as a wide area network or the Internet, accessible by the various components of system 300.

Figure 4A:
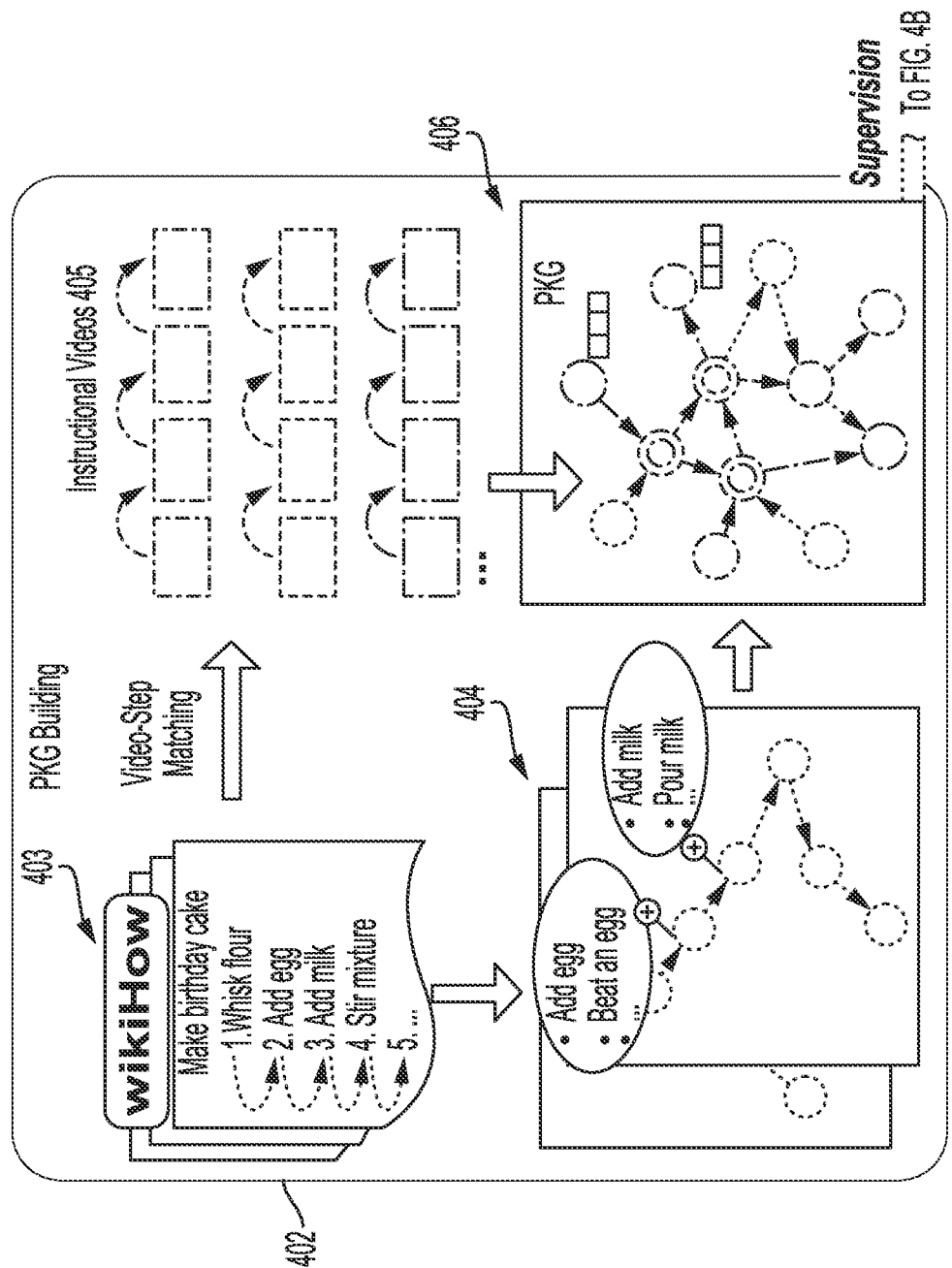
FIGS. 4A-4C illustrate an exemplary framework for training a video model with procedure understanding according to some embodiments described herein.
Figure 4B:
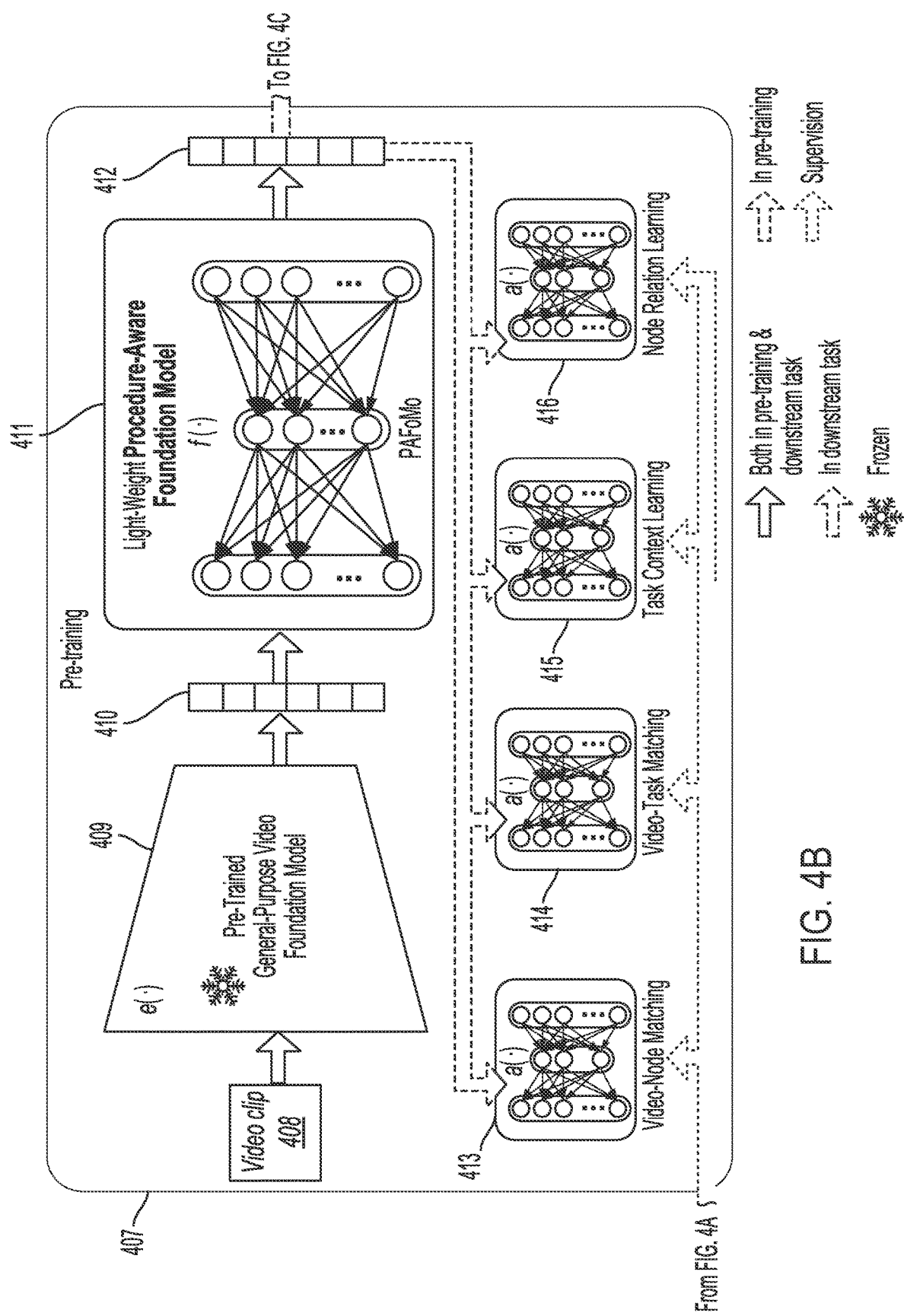
Figure 4C:
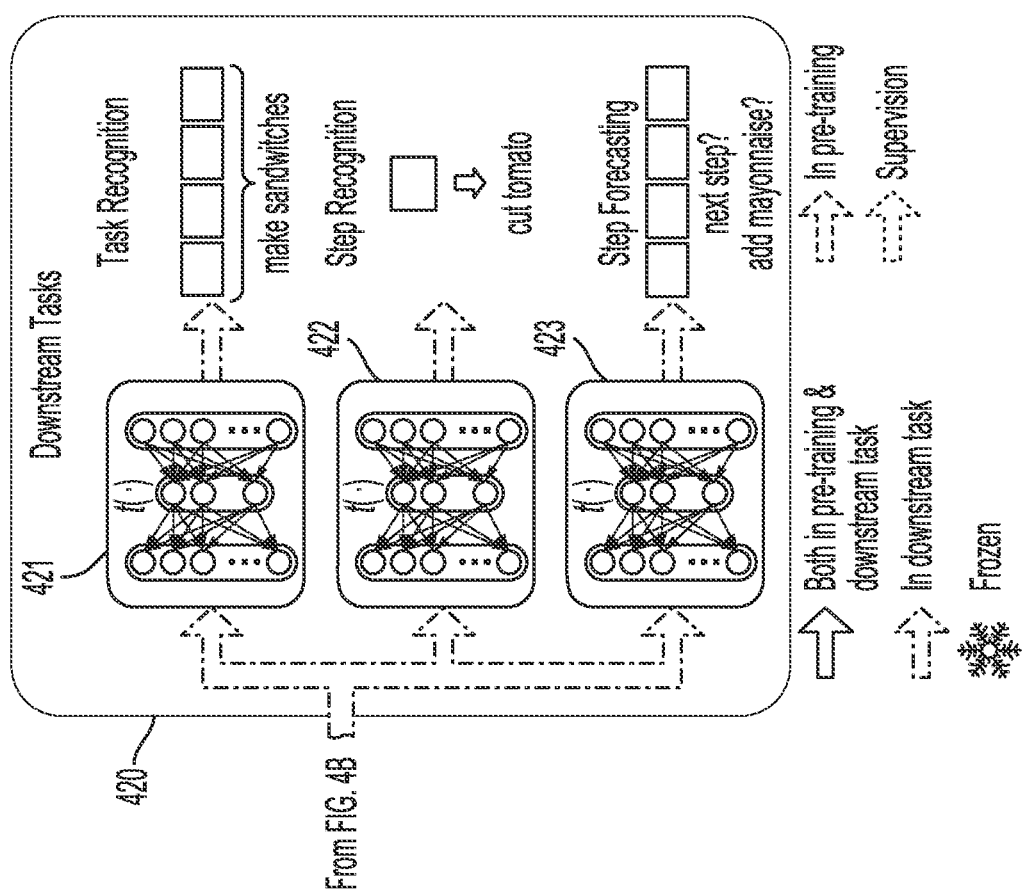

FIGS. 4A-4C illustrate an exemplary framework for training a video model with procedure understanding according to some embodiments described herein. FIGS. 4A and 4B offer a more detailed description of a framework for training a foundation video model with procedure understanding similar to FIG. 1. FIG. 4C illustrates how the trained model may be utilized for different tasks.

FIG. 4A illustrates a framework for generating a procedure knowledge graph (PKG). PKG building framework 402 is similar, for example, to procedure knowledge graph building module 102 of FIG. 1. One source of data for building a PKG may be a database of text-based procedure descriptions, such as wikiHow database 403. As illustrated, database 403 may include text descriptions of procedures such as how to make a birthday cake, which may include a number of steps. These steps may be represented by nodes in a graph, where the edges of the graph connecting the nodes represent the sequential relationship of the steps (e.g., "whisk flour" precedes "add egg"). As illustrated, each procedure description from database 403 may be used to generate a sub-graph 404, and the collection of sub-graphs may be merged together into PKG 406.

In this way, the resulting, different combinations of nodes and connecting edges in the PKG 406 may represent different procedures. These procedures may have overlapping or non-overlapping nodes. For example, "add egg" may be a node for a procedure for making a cake, and also in a procedure for making cookies. Thus the procedures of making a cake and the procedure of making cookies will have the shared node "add egg." This step may be represented by a single node in the merged PKG 406, and the respective previous and next steps for each procedure may each have edges from that same node.

Another source of data for PKG 406 may be instructional videos 405. Instructional Videos 405 may be divided into shorter video clips (e.g., 9 second clips), which may each be analyzed to determine what action or actions are performed in each clip. This may be performed by an existing video neural network model. In some embodiments, information extracted from instructional videos 405 is informed by additional information, such as the association of the video with text-based instructions and/or captions. In some embodiments, instructional videos 405 may include videos associated with text-based instructions in database 403. Additional information may be included in a video which is not present in the related text-based description, and in some cases the text-based description may include additional or different details that are not included in the video. By combining data from both video and text, the PKG 406 may include more information than it would be including only one data source. As discussed with respect to FIG. 4B, PKG 406 may be used to generate supervisory signals for training a video model. A more detailed illustration of an exemplary PKG is in FIG. 9.

The generation of PKG 406 may be formalized as follows. The PKG may be considered a homogeneous graph $\mathcal{G} = (\mathcal{V}, \varepsilon)$ with vertex $\mathcal{V}$ and edge set $\varepsilon$. Nodes represent steps (e.g., 'add milk') from a wide variety of tasks (e.g., 'how to make latte'), and edges represent directed step transitions. That is, edge (i, j) indicates that a transition between steps in nodes i and j was observed in real-life procedural data.

$\mathcal{V}$ contains steps of tasks that may appear in instructional videos. Pre-training the video model may use unlabeled videos, thus, there are no step annotations provided by the pre-training video corpus that can be directly used to form the discrete node entities. Related information such as step headlines in wikiHow, which provide natural-language-based instructions, may be used as an alternative.

A text-based procedural knowledge database (e.g., wikiHow) $\mathbb{B}$ that contains articles describing the sequence of steps needed for the completion of a wide range of tasks. $\mathbb{B} = [s_1^{(1)}, \ldots, s_{b_1}^{(1)}, \ldots, s_1^{(t)}, \ldots, s_{b_t}^{(t)}, \ldots, [s_1^{(T)}, \ldots, s_{b_T}^{(T)}]$ where T is #tasks, the subscript $b_t$ is #steps of task t, and $s_i^{(t)}$ represents the natural language based summary (i.e., step headline) of i-th step for task t.

Since two step headlines in $\mathbb{B}$ can represent the same step but are described slightly differently, e.g., "jack up the car" and "jack the car up", a deduplication step may be performed by clustering similar step headlines. The resulting clusters are step nodes that constitute $\mathcal{V}$.

Edges may e added to the graph relating the nodes. E is the set of direct transitions observed in data between any two step nodes. However, most tasks in $\mathbb{B}$ have only one article, which provides only one way to complete the task through a sequence of steps. In order to encode the different ways to complete a task t that involve different execution order of steps or new steps that are absent in the article of task t, the system may additionally leverage an unlabeled instructional video corpus to provide more abundant step transition observations. In order to achieve that, steps from the text-based instructions (e.g. wikiHow) may be matched to segments of unlabeled videos.

A pre-trained video-language model (e.g., MIL-NCE as described in Miech et al., End-to-end learning of visual representations from uncurated instructional videos, In Proceedings or the IEEE/CVF Conference on Computer Vision and Pattern Recognition, 9879-9889, 2020), may be used to compute the matching score between a segment $x_j$ and a step headline $s_i^{(t)}$. The pre-trained video-language model may be trained to learn video and text embeddings with high matching scores on co-occurring frames and ASR subtitles.

Step nodes may then be matched to segments and step node transitions of the videos obtained, using a thresholding criterion and the correspondence between step headlines and step nodes. The step node transitions from the text corpus (e.g., wikiHow) or the video corpus constitute $\varepsilon$.

$\varepsilon$ encodes the structure observed in instructional videos as it encompasses multiple sequences of steps that repeat between video instances of the same or different tasks. In addition, E captures the relations of steps; the type of relation is not strictly defined—the steps could be temporal or causal related—because the step transitions that form E are observed from human-provided real-life demonstrations.

Node attributes can be the step headline texts, task names associated with step headlines of the node, video segments matched to the node, the distribution of timestamps of the matched segments, the aggregated multimodal features of the matched segments, and so on. Edge attributes can be the source of the step node transition (e.g., from the text-based instructions such as wikiHow, or the video corpus), task occurrence, distribution of timestamps of the transition, and so on. It is possible to collect various forms of attributes for PKG depending on the desired use cases of PKG.

FIG. 4B illustrates a framework 407 for training a procedure-aware foundation model 411 using supervisory signals based on the PKG 406. Input video clip 408 is first passed through a pre-trained general-purpose video foundation model 409, which produces latent representation 410, which may be a vector representation. In some embodiments, video clip 408 is divided into multiple shorter clips, and the representation 410 represents a single clip of the full video 408. The light-weight procedure-aware foundation model (PAFoMo) 411 is given the representation 410 as an input, and based on the neural network connections and weights, produces a second latent representation 412. In some embodiments, pre-trained model 409 may be omitted, and a single model (e.g., model 411) may be used. The benefits of using an existing pre-trained model 409 may reduce training time, and leverage existing training, however it is not necessary.

In order to train model 411 such that representation 412 includes procedure knowledge, a number of tasks may be performed using the representation 412 as an input which require procedure knowledge in order to generate good results. For example, decoders 413-416 that generate different decoder outputs representing different tasks, such as video-node matching, video-task matching, task-context learning, and node relation learning may each generate a corresponding output using the video clip representation 412.

Specifically, for each of the decoders 413-416, a ground-truth signal may be generated by querying PKG 406. A comparison between the ground-truth signal and the prediction outputs by decoders 413-416 may be used to compute a loss, respectively. By computing a gradient of the loss, back-propagation may be performed to update the weights of decoder 413 and model 411. The weights of the pre-trained model 409 may be frozen, and therefore not updated at this stage. In addition to (or instead of) video-node matching, other pre-training tasks may be used to train model 411. As with decoders 413-416, each of the tasks may have an associated decoder which produces an output which is compared to a ground-truth supervisory signal generated based on PKG 406. The comparisons may produce loss signals which may be used to back-propagate and update weights of the respective decoders and the model 411. The different tasks may be trained in parallel by considering the entire structure as a single model, and combining the loss signals together.

In one embodiment, the video-node matching (VNM) decoder 413 may generate an answer: what are the step nodes of PKG 406 that are likely to be matched to the input video segment 408 $x_i$? This pre-training objective leverages the node identity information of PKG 406. Formally, $$a(f(e(x_i))) \rightarrow \mathcal{V}_{VNM} \quad (1)$$

where a (•) denotes the answer head decoder model that performs the pre-training objective given the refined video segment feature $z_i$ produced by f(•) as input, and $\mathcal{V}_{VNM} \subseteq \mathcal{V}$. Further, e(•) may represent the pre-trained model 409 and f(•) may represent model 411.

In one embodiment, the Video-Task matching (VTM) decoder 414 may generate an answer: what are the tasks of the matched step nodes of the input video segment $x_i$ (i.e., what are the tasks that the video segment can belong to)?

This pre-training objective leverages the node's task attribute in PKG. VTM focuses on inferring the cross-knowledge of the step nodes without the video context. Formally, $$a(f(e(x_i))) \rightarrow T_{VTM} \quad (2)$$

where $T_{VTM} \subseteq T$, and T is the set of tasks ($\|T\| := T$). The ground-truth task names may be derived from the task names from the video or text corpus. When task names from both corpuses are used, VTM leads to 2 answer heads.

In one embodiment, the Task Context Learning (TCL) decoder may generate an answer: for tasks the input video segment may belong to (produced by VTM), what are the step nodes that the tasks would typically need? TCL also leverages the node's task attribute in PKG 406, but it focuses on inferring step nodes that may co-occur with the matched step node of the video segment in demonstrations. TCL learns the task's step context that is commonly observed in data, without the context of the current video segment. Formally, $$a(f(e(x_i))) \rightarrow \mathcal{V}_{TCL} \quad (3)$$

In one embodiment, the Node Relation Learning (NRL) decoder 416 may generate an answer: what are the k-hop in-neighbors and out-neighbors of the matched step nodes of the input video segment 408 $x_i$? k ranges from 1 to a pre-defined integer K, and thus NRL leads to 2K sub-questions (2K answer heads). NRL leverages the edge information of PKG, and it focuses on learning the local multi-scale graph structure of the matched nodes of $x_i$. Predicting the in-neighbors resembles predicting the historical steps, whereas predicting the out-neighbors resembles forecasting the next steps of $x_i$. However, prediction of NRL is not conditioned on the video context. Note that the answer to NRL can be steps that come from other tasks different from the task of the current video. Formally, $$a(f(e(x_i))) \rightarrow \mathcal{V}_{NRL} \quad (4)$$

where $\mathcal{V}_{NRL} \subseteq V$.

Therefore, the losses computed based on decoder output from decoders 413, 414, 415 and 416 may each individually backpropagate the respective decoder and the light-weight procedure-aware foundation model 411 alternately, sequentially, interchangeably or in parallel. In some embodiments, a sum of the VNM, VTM, TCL and NRL losses may be computed to jointly update the light-weight procedure-aware foundation model 411.

FIG. 4C illustrates how the trained model may be utilized for different tasks. After training the light-weight procedure-aware foundation model 411 as described in FIG. 4B, the trained model 411 may be re-used for downstream tasks which benefit from encoded procedure knowledge. Since PKG 406 is not used in the fine-tuning of down-stream tasks, it may be discarded after pretraining. Similarly, the pretraining task decoders 413, 414, 415, and 416 may be discarded after pretraining. A number of different downstream tasks may leverage the trained model 411, either individually or together. For example, a decoder 421 may be trained using the output of model 411 (or sequence of outputs) as an input, to generate a task recognition prediction. Task recognition (TR) aims to classify the activity/task given all segments from a video. Decoder 422 may be trained to perform step recognition (SR). SR recognizes the step class given as input the segments of a step in a video. Future step forecasting (SF) may be performed by training decoder 423. SF predicts the class of the next step given the past video segments. Such input contains the historical steps before the step to predict what happens.

When training a decoder (e.g., decoder 421) for a downstream task, model 411 may be frozen, or model 411 may continue to update during the training process. After training for a downstream task, the trained model may be used to make predictions (e.g., task recognition, step recognition, and/or step forecasting) based on a video input. The predictions may be transmitted and/or displayed on a display of a user device (e.g., user device 310 of FIG. 3).

Example Work Flows

Figure 5:
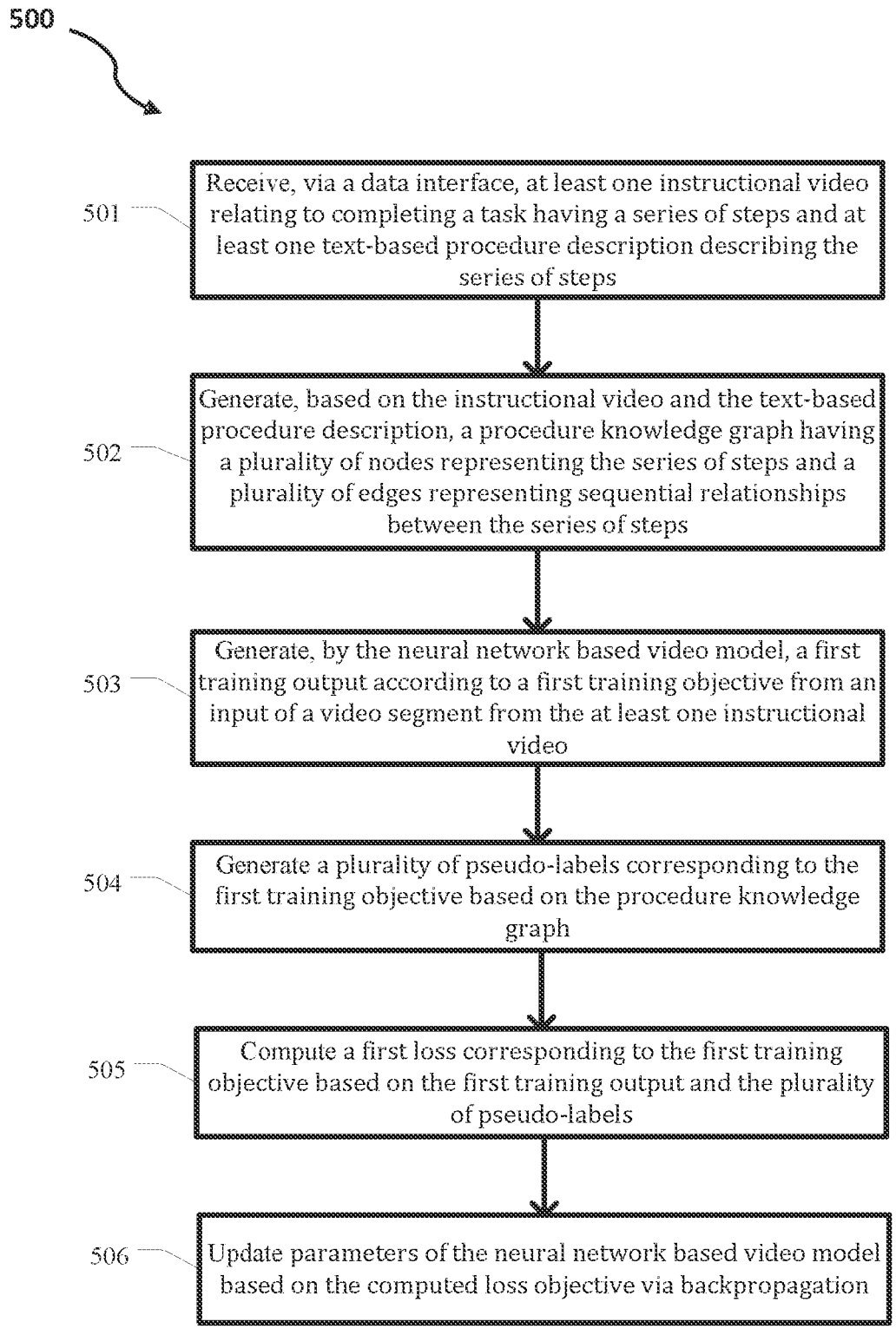
FIG. 5 illustrates an example logic flow diagram illustrating a method of training a video model with procedure understanding according to some embodiments described herein.

FIG. 5 is an example logic flow diagram illustrating a method of training a video model with procedure understanding based on the framework shown in FIGS. 1-4, according to some embodiments described herein. One or more of the processes of method 500 may be implemented, at least in part, in the form of executable code stored on non-transitory, tangible, machine-readable media that when run by one or more processors may cause the one or more processors to perform one or more of the processes. In some embodiments, method 500 corresponds to the operation of the procedure understanding module 230 (e.g., FIGS. 2-3) that generates a PKG, trains the foundation video model using pseudo-labels based on the PKG, and may fine-tune the model for specific tasks.

As illustrated, the method 500 includes a number of enumerated steps, but aspects of the method 500 may include additional steps before, after, and in between the enumerated steps. In some aspects, one or more of the enumerated steps may be omitted or performed in a different order.

At step 501, a system receives, via a data interface (e.g., data interface 215 in FIG. 2), at least one instructional video relating to completing a task having a series of steps and at least one text-based procedure description describing the series of steps.

At step 502, the system generates, based on the instructional video and the text-based procedure description, a procedure knowledge graph (e.g., PKG 406 in FIG. 4A) having a plurality of nodes representing the series of steps and a plurality of edges representing sequential relationships between the series of steps.

At step 503, the system generates, by the neural network based video model, a first training output according to a first training objective from an input of a video segment from the at least one instructional video. The neural network based video model may include a pretrained general purpose video foundation model (e.g., model 409 of FIG. 4B), a procedure-aware foundation model (e.g., model 411 of FIG. 4B), and/or task-specific decoders (e.g., decoders 413-416 of FIG. 4B). Generating the first training output may include generating by a pre-trained video foundation encoder (e.g., model 409) and a light-weight encoder (e.g., model 411), a latent representation (e.g., representation 412) of the input of the video segment. The training output may then be generated by a decoder (e.g., decoder 413) corresponding to the first training objective (e.g., video-node matching), the first training output.

In some embodiments, the output may be multiple outputs generated by multiple decoders (e.g., decoders 413-416), where each of the outputs corresponds to a respective pseudo-label of the plurality of pseudo-labels. As each of the decoders may be associated with a different pre-training task, their outputs may be compared to pseudo-labels which are generated by different queries to the procedure knowledge graph. Parameters of the light-weight model may be updated based on a loss function while keeping the pre-trained video foundation encoder frozen.

At step 504, the system generates a plurality of pseudo-labels corresponding to the first training objective based on the procedure knowledge graph. In some embodiments, generating pseudo-labels may be done by performing one or more queries on the procedure knowledge graph.

At step 505, the system computes a first loss corresponding to the first training objective based on the first training output and the plurality of pseudo-labels. The first loss may be made up of multiple losses, each associated with a different decoder output and corresponding pseudo-label. In this way multiple tasks may be trained in parallel so that the model may incorporate different types of procedure knowledge.

At step 506, the system updates parameters of the neural network based video model based on the computed loss objective via backpropagation. In some embodiments, the decoders and light-weight model are updated, and the general-purpose video foundation model is frozen.

Example Results

FIGS. 6-7 provide charts illustrating exemplary performance of different embodiments described herein.

One of the video databases used in experiments is HowTo100M, which is a large-scale video dataset that contains over 1M long instructional videos (videos can be over 30 minutes) and is described in Miech et al., HowTo100M: Learning a Text-Video Embedding by Watching Hundred Million Narrated Video Clips, ICCV, 2019. Videos were also collected from YouTube using wikiHow article titles as search keywords. To reduce the computational cost, most of the experiments, including the construction of PKG, only use the HowTo100M subset of size 85K videos as described in Bertasius et al., Is space-time attention al you need for video understanding?, ICML, volume 2, p. 4, 2021.

The transfer learning ability of embodiments of the models described herein trained using PKG was tested on 12 evaluation settings: 3 downstream tasks 2 downstream datasets 2 downstream models. The output of the trained procedure-aware foundation model (e.g., model 411) is the input to the downstream model (e.g., decoder 421). Note that the graph PKG is only used for training and it is discarded at the downstream evaluation time (test time for model 411).

Long-Term Activity/Task Recognition (TR) aims to classify the activity/task given all segments from a video. Step Recognition (SR) recognizes the step class given as input the segments of a step in a video. Future Step Forecasting (SF) predicts the class of the next step given the past video segments. Such input contains the historical steps before the step to predict happens.

Experiments were performed using down-stream datasets COIN as described in Tang et al., Coin: A large-scale dataset for comprehensive instructional video analysis, In Proceedings of the IEEE/CVF Conference on Computer Vision and Pattern Recognition, pages 1207-1216, 2019; and CrossTask as described in Zhukov et al., Cross-task weakly supervised learning from instructional videos, In Proceedings of the IEEE/CVF Conference on Computer Vision and Pattern Recognition, pages 3537-3545, 2019. COIN contains 11K instructional videos covering 778 individual steps from 180 tasks in various domains. The average number of steps per video is 3.9. CrossTask has 4.7K instructional videos annotated with task name for each video spanning 83 tasks with 105 unique steps. 2.7K videos have steps' class and temporal boundary annotations; these videos are used for the SR and SF tasks. 8 steps per video on average.

Segment features from the trained frozen model (e.g., model 411) are the input to downstream task model (e.g., decoder 421). The downstream task model is trained and evaluated on the smaller-scale downstream dataset to perform downstream tasks. Experiments were performed with two model options for performing downstream tasks, multilayer perceptron (MLP) and Transformer.

MLP with only 1 hidden layers is the classifier of the downstream tasks, given the input of mean aggregated sequence features. Since a shallow MLP has a limited capacity, performance of a MLP downstream task model heavily relies on the quality of the input segment features.

For the transformer downstream model, since context and temporal reasoning is crucial for the downstream TR and SF tasks, a one-layer Transformer was used to allow the downstream task model the capability to automatically learn to reason about segment and step relations. Transformer is a relatively stronger downstream task model compared to MLP.

Experiments were performed with the version of $\mathbb{B}$ that has 10,588 step headlines from T=1,053 task articles. Agglomerative Clustering was used given the features of step headlines, which resulted in 10,388 step nodes. Length of segments was set to be 9.6 seconds. For the pre-trained general purpose video foundation model (e.g., model 409), the model used in experiments was MIL-NCE as described in Miech et al., End-to-end learning of visual representations from uncurated instructional videos, In Proceedings or the IEEE/CVF Conference on Computer Vision and Pattern Recognition, 9879-9889, 2020). The PAFoMo model (e.g., model 411) was a multi-layer perceptron with a bottleneck layer that has a dimension of 128 as the only hidden layer. The dimension of the refined feature was set to be the same as the input feature (i.e., 512). The pre-training objectives were cast to a multi-label classification problem with Binary Cross Entropy as the loss function. The Adam optimizer was used as described in Kingma and Ba, Adam: A method for stochastic optimization, arXiv preprint arXiv:1412.6980, 2014.

FIGS. 6A-6B illustrate the accuracies of the downstream procedure understanding tasks under the 12 evaluation settings described above. Embodiments of the framework described herein significantly outperformed alternative methods. Among the four pre-training objectives, NRL is the most effective one, because it exploits the structure information of the PKG and elicits the procedural knowledge on the order and relation of cross-task steps.

FIG. 7 illustrates the results in a performance matrix in order to compare the overall performance of the different pretraining objectives.

The performance ranking of the four pre-training objectives, as shown in FIGS. 6A-6B and FIG. 7 is VNM is outperformed by VTM, which is outperformed by TCL, which is outperformed by NRL. VNM is the least powerful because it only focus on learning the simpler knowledge of matching single video segments to steps.

VTM (w+h) performed better than VTM (w), which performed better than VTM (h) where 'w' denotes wikiHow and 'h' for HowTo100M. This ranking suggests that if the pre-training corpus has the annotation of video's task name, methods described herein can well utilize such annotation to further improve performance. Utilizing the wikiHow task names is better than HowTo100M because the mapping between step headlines and HowTo100M tasks would not be as clean as the mapping between step headlines and wikiHow tasks, because the former depends on the quality of the matching between a video segment to a step headline.

Comparing the three variants of TCL, TCL (w) performed better than TCL (w+h) which performed better than TCL (h). Overall, TCL (w+h) is worse than TCL (w) because TCL depends on the quality of the pseudo labels of VTM. As utilizing the HowTo100M task names already leads to probably problematic matched tasks, asking the model to further identify the step nodes that these matched tasks need would introduce additional noise, which eventually undermines the overall downstream performance.

NRL (2 hops) performed better than NRL (1 hop) overall. NRL (2 hops) has a worse or close performance than NRL (1 hop) only when the downstream task model is Transformer. When the downstream model is MLP, NRL (2 hops) is always clearly better. This is because when the capacity of the downstream model is limited, it desires the input video representations to encode more comprehensive information. NRL with more hops indicates a larger exploration on the local graph structure of PKG that a video segment belongs to; it can provide more related neighboring node/step information, and allow the learned video representations to excel at the downstream tasks.

The PAFoMo model (e.g, model 411) was trained using all pre-training objectives without tuning coefficient of each loss term. PAFoMo trained using all pre-training objectives yields the best result on 8 out of 12 evaluation settings, which suggests the four pre-training objectives can collaborate to lead to better results. This variant of PAFoMo uses 1 hop for NRL. Compared with NRL (1 hop), the performance gains brought by VNM, VTM and TCL are relatively small. This variant also fails to outperform NRL (2 hops) on the SF and SR tasks when the downstream task model is MLP. These results highlight the superiority of NRL.

A model used for comparison is DS, as described in Lin et al., Learning to recognize procedural activities with distant supervision, In Proceedings of the IEEE/CVF Conference on Computer Vision and Pattern Recognition, pages 13853-13863, 2022.

An experiment was also performed with the full HowTo100M data. Increasing the size of the pre training dataset, for both DS and PAFoMo, accuracies are dropped on the COIN dataset when the downstream task model is MLP, but a performance improvement is observed on the rest 9 out of 12 evaluation settings.

The methods described herein significantly outperform the SOTA (as shown in FIGS. 6A-6B). The large performance improvement of compared to MIL-NCE suggests the extraordinary ability of the methods in adapting the inferior video features to be instead competent at the procedure understanding tasks.

The methods described herein also largely outperform DS. VNM has the closest results to DS because both focus on learning step knowledge; the better results of VNM attribute to multi-modal matching—matching the video frames to the step nodes that summarize and unite different step headlines in the same action. VNM benefits from the more semantically meaningful matching results. VTM, TCL and NRL learn more advanced procedural knowledge from PKG, and therefore their gains over DS are even more obvious.

PAFoMo pre-trained with all four pre-training objectives obtains the highest relative gain over DS, which is 31.44% on the COIN step recognition task when the downstream task model is MLP and the HowTo100M subset is the pre-training dataset. Overall, the relative gains on COIN are larger than that on CrossTask, and the gains are larger when the downstream task model is MLP than Transformer. Moreover, a shallow MLP downstream model, learned with features from PAFoMo pre-trained using our full methods, even outperforms the Transformer downstream model learned with input features from SOTA foundation models. This highlights PKG allows the video feature to early encode relation information to address the limitation of a MLP model in lacking the relational reasoning capability.

Figure 8:
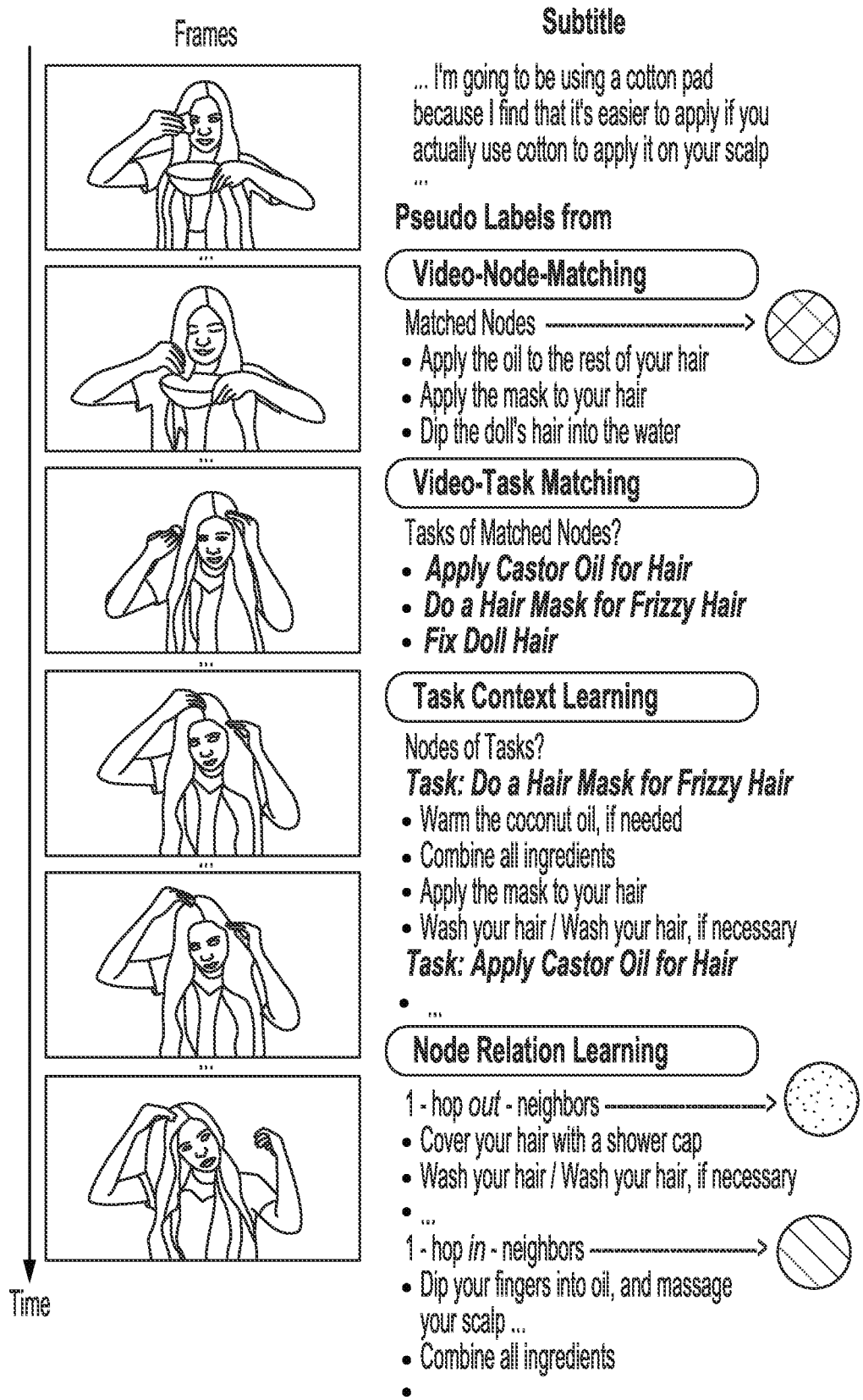
FIG. 8 illustrates an exemplary video clip with pseudo labels generated based on a procedure knowledge graph according to some embodiments described herein.

FIG. 8 illustrates an exemplary video clip with pseudo labels generated based on a procedure knowledge graph according to some embodiments described herein. Compared to the subtitles, the source of information that prior video foundation models often use for supervision, the pseudo labels generated by PKG entail a much higher relevance to each segment. Subtitles are noisy because the narrator may not directly describe the step or action. E.g., in the 1st segment, the narrator only mentions "I'm going to be using a cotton pad . . . " without explicitly describing the step "apply the mask to your hair." When the camera records how a narrator is performing a step, the narrator would often omit verbally or formally describing the step. Out of this observation, a multimodal matching function was leveraged. This is the reason why step headlines of the matched nodes of methods described herein have a better quality than the top matched step headlines of DS.

Assigning wikiHow steps to a video, allows one video to leverage cross-task information sharing. As shown in the pseudo labels of VNM, the matched step headlines can come from another task. E.g., "Dip the doll's hair into the water" is a step headline of the task "Fix Doll Hair", but the task of the video is "Do a Hair Mask for Frenzy".

TCL and NRL provide more procedure-level context information as shown in FIG. 8. The procedural knowledge conveyed by TCL and NRL is the general prior knowledge about the step and task of the current segment, and the knowledge is not constrained to the current step, task, or video. In other words, steps shown in the TCL or the NRL blocks can be absent in this video demonstration.

Figure 9:
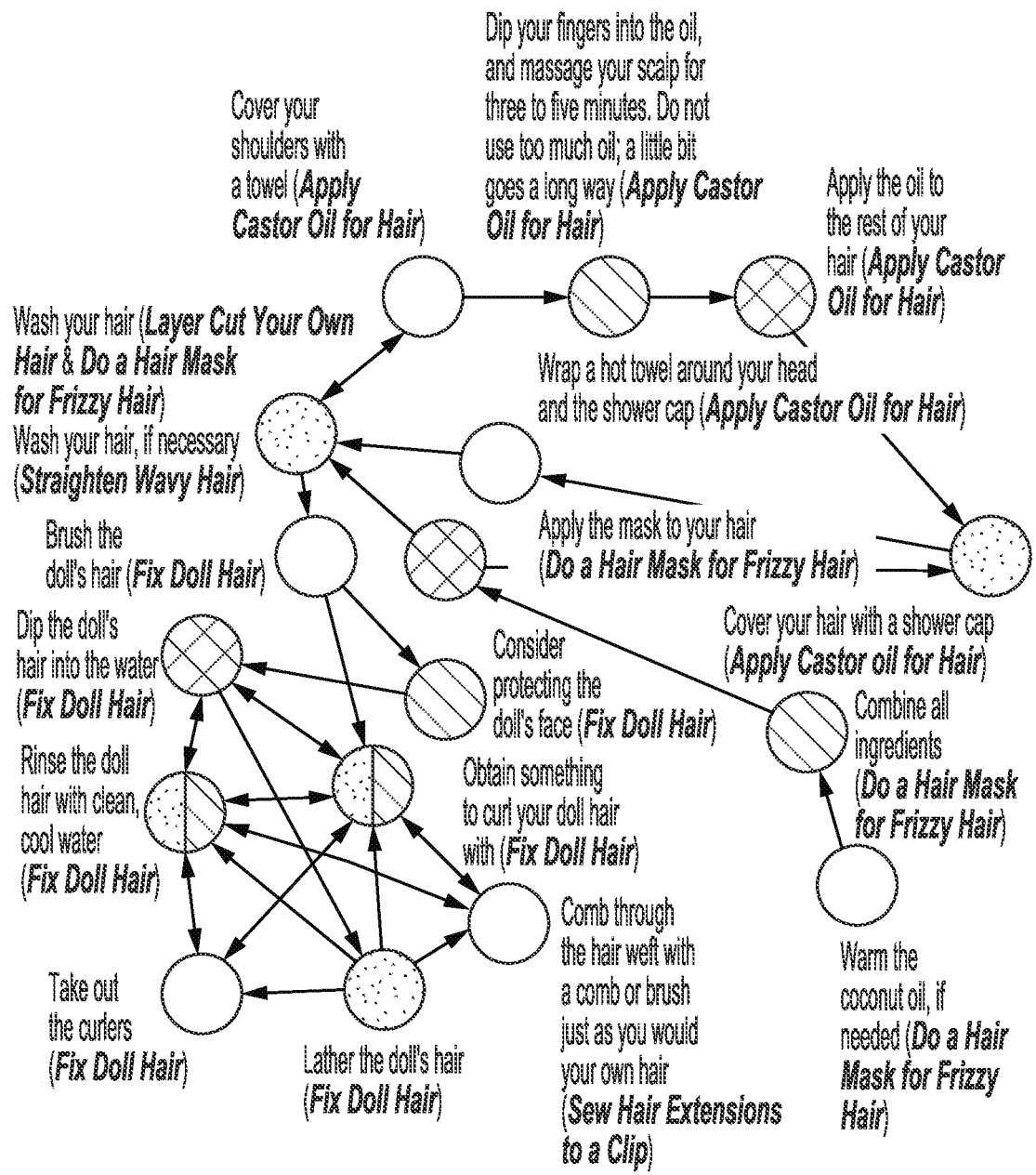
FIG. 9 illustrates an exemplary procedure knowledge graph associated with the exemplary video clip of FIG. 8 according to some embodiments described herein.

FIG. 9 illustrates an exemplary procedure knowledge graph (or sub-graph) associated with the exemplary video clip of FIG. 8 according to some embodiments described herein. Nodes are marked to illustrate the corresponding nodes indicated in FIG. 8. As illustrated, the top 3 matched nodes' step headlines come from different tasks, and especially the top 2 well describe the step of the video segment. NRL allows PAFoMo to learn the knowledge on order and relation of cross-task steps because pseudo labels of NRL are led by the structure of PKG.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method of training a neural network based video model to perform a task from an input instructional video, the method comprising:
   receiving, via a data interface, at least one instructional video relating to completing a task having a series of steps and at least one text-based procedure description describing the series of steps;
   generating, based on the instructional video and the text-based procedure description, a procedure knowledge graph having a plurality of nodes representing the series of steps and a plurality of edges representing sequential relationships between the series of steps;
   generating, by the neural network based video model, a first training output according to a first training objective from an input of a video segment from the at least one instructional video;
   generating a plurality of pseudo-labels corresponding to the first training objective based on the procedure knowledge graph;
   computing a first loss corresponding to the first training objective based on the first training output and the plurality of pseudo-labels; and
   updating parameters of the neural network based video model based on the computed first loss via backpropagation.

2. The method of claim 1, wherein generating, by the neural network based video model, the first training output comprises:
   generating, by a pre-trained video foundation encoder and a light-weight encoder, a latent representation of the input of the video segment;
   generating, by a decoder corresponding to the first training objective, the first training output; and
   updating parameters in the light-weight encoder based on the first loss while keeping the pre-trained video foundation encoder frozen.

3. The method of claim 1, wherein the generating the plurality of pseudo-labels includes performing one or more queries on the procedure knowledge graph according to the first training objective.

4. The method of claim 3, wherein the first training output includes a plurality of outputs, each of the plurality of outputs corresponding to a respective pseudo-label of the plurality of pseudo-labels.

5. The method of claim 4, wherein the plurality of outputs are associated with different queries performed on the procedure knowledge graph.

6. The method of claim 1, wherein generating, by the neural network based video model, the first training output includes generating a latent representation of the input of the video segment, further comprising:

training a task-specific neural network model which takes the latent representation as an input, and outputs a prediction associated with the input of the video segment.

7. The method of claim 1, further comprising:
generating a second training output according to a second training objective from the input of the video segment;
generating a second plurality of pseudo-labels corresponding to the second training objective based on the procedure knowledge graph;
computing a second loss corresponding to the second training objective based on the second training output and the second plurality of pseudo-labels; and
updating parameters of the neural network based video model based on the computed second loss via backpropagation.

8. The method of claim 7, wherein the first training objective or the second training objective is one of video-node matching, video-task matching, task context learning or node relation learning.

9. A system for training a neural network based video model to perform a task from an input instructional video, the system comprising:
a memory that stores the video model and a plurality of processor executable instructions;
a communication interface that receives at least one instructional video relating to completing a task having a series of steps and at least one text-based procedure description describing the series of steps; and
one or more hardware processors that read and execute the plurality of processor-executable instructions from the memory to perform operations comprising:
generating, based on the instructional video and the text-based procedure description, a procedure knowledge graph having a plurality of nodes representing the series of steps and a plurality of edges representing sequential relationships between the series of steps;
generating, by the neural network based video model, a first training output according to a first training objective from an input of a video segment from the at least one instructional video;
generating a plurality of pseudo-labels corresponding to the first training objective based on the procedure knowledge graph;
computing a first loss corresponding to the first training objective based on the first training output and the plurality of pseudo-labels; and
updating parameters of the neural network based video model based on the computed first loss via backpropagation.

10. The system of claim 9, wherein generating, by the neural network based video model, the first training output comprises:
generating, by a pre-trained video foundation encoder and a light-weight encoder, a latent representation of the input of the video segment;
generating, by a decoder corresponding to the first training objective, the first training output; and
updating parameters in the light-weight encoder based on the first loss while keeping the pre-trained video foundation encoder frozen.

11. The system of claim 9, wherein the generating the plurality of pseudo-labels includes performing one or more queries on the procedure knowledge graph according to the first training objective.

12. The system of claim 11, wherein the first training output includes a plurality of outputs, each of the plurality of outputs corresponding to a respective pseudo-label of the plurality of pseudo-labels.

13. The system of claim 12, wherein the plurality of outputs are associated with different queries performed on the procedure knowledge graph.

14. The system of claim 9, wherein generating, by the neural network based video model, the first training output includes generating a latent representation of the input of the video segment, further comprising:
training a task-specific neural network model which takes the latent representation as an input, and outputs a prediction associated with the input of the video segment.

15. The system of claim 9, the operations further comprising:
generating a second training output according to a second training objective from the input of the video segment;
generating a second plurality of pseudo-labels corresponding to the second training objective based on the procedure knowledge graph;
computing a second loss corresponding to the second training objective based on the second training output and the second plurality of pseudo-labels; and
updating parameters of the neural network based video model based on the computed second loss via backpropagation.

16. The system of claim 15, wherein the first training objective or the second training objective is one of video-node matching, video-task matching, task context learning or node relation learning.

17. A non-transitory machine-readable medium comprising a plurality of machine-executable instructions which, when executed by one or more processors, are adapted to cause the one or more processors to perform operations comprising:
receiving, via a data interface, at least one instructional video relating to completing a task having a series of steps and at least one text-based procedure description describing the series of steps;
generating, based on the instructional video and the text-based procedure description, a procedure knowledge graph having a plurality of nodes representing the series of steps and a plurality of edges representing sequential relationships between the series of steps;
generating, by a neural network based video model, a first training output according to a first training objective from an input of a video segment from the at least one instructional video;
generating a plurality of pseudo-labels corresponding to the first training objective based on the procedure knowledge graph;
computing a first loss corresponding to the first training objective based on the first training output and the plurality of pseudo-labels; and
updating parameters of the neural network based video model based on the computed first loss via backpropagation.

18. The non-transitory machine-readable medium of claim 17, wherein the generating the plurality of pseudo-labels includes performing one or more queries on the procedure knowledge graph according to the first training objective.

19. The non-transitory machine-readable medium of claim 18, wherein the first training output includes a plurality of outputs, each of the plurality of outputs corresponding to a respective pseudo-label of the plurality of pseudo-labels.

20. The non-transitory machine-readable medium of claim 17, further comprising:
generating a second training output according to a second training objective from the input of the video segment;
generating a second plurality of pseudo-labels corresponding to the second training objective based on the procedure knowledge graph;
computing a second loss corresponding to the second training objective based on the second training output and the second plurality of pseudo-labels; and
updating parameters of the neural network based video model based on the computed second loss via backpropagation.

* * * * *